A. W. BODELL.
ICE CUBING MACHINE.
APPLICATION FILED JAN. 25, 1909.
1,010,013.
Patented Nov. 28, 1911.
3 SHEETS—SHEET 1.
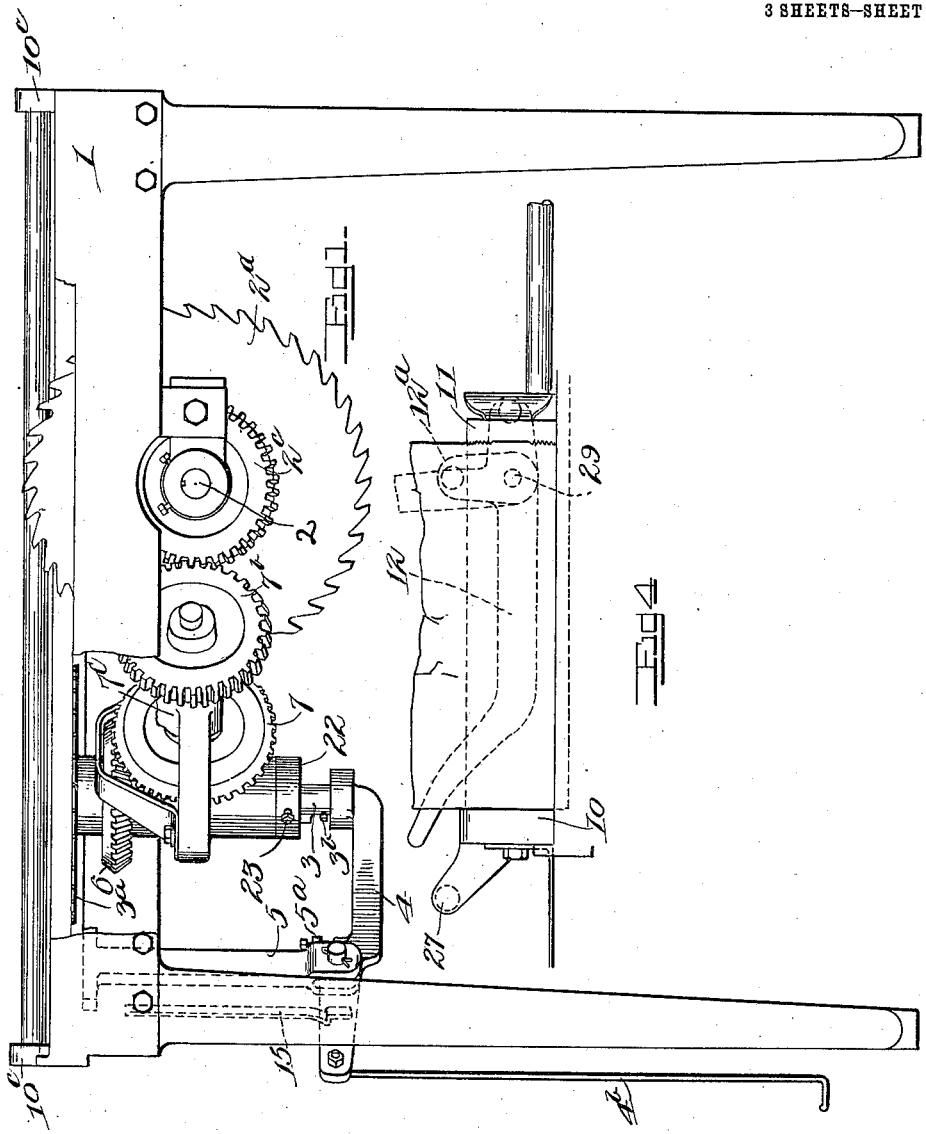

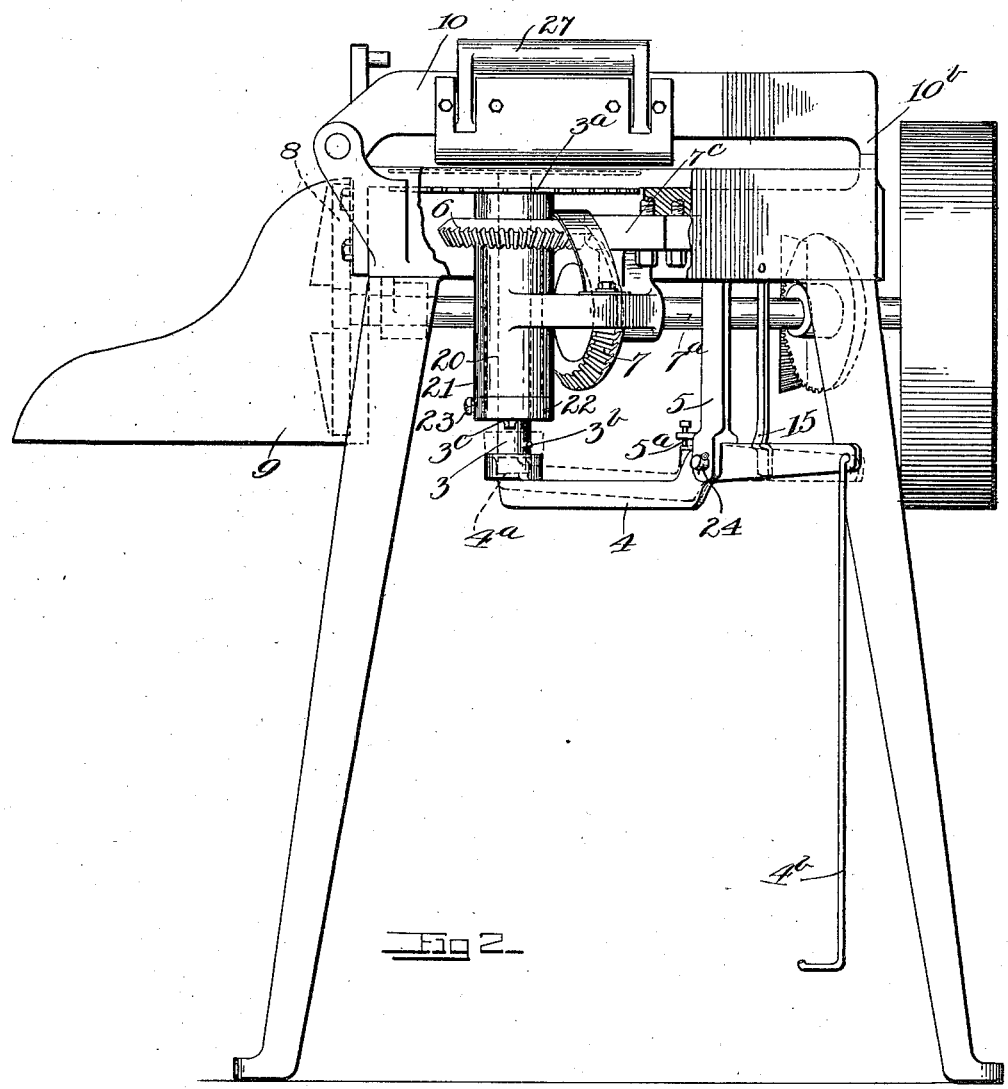

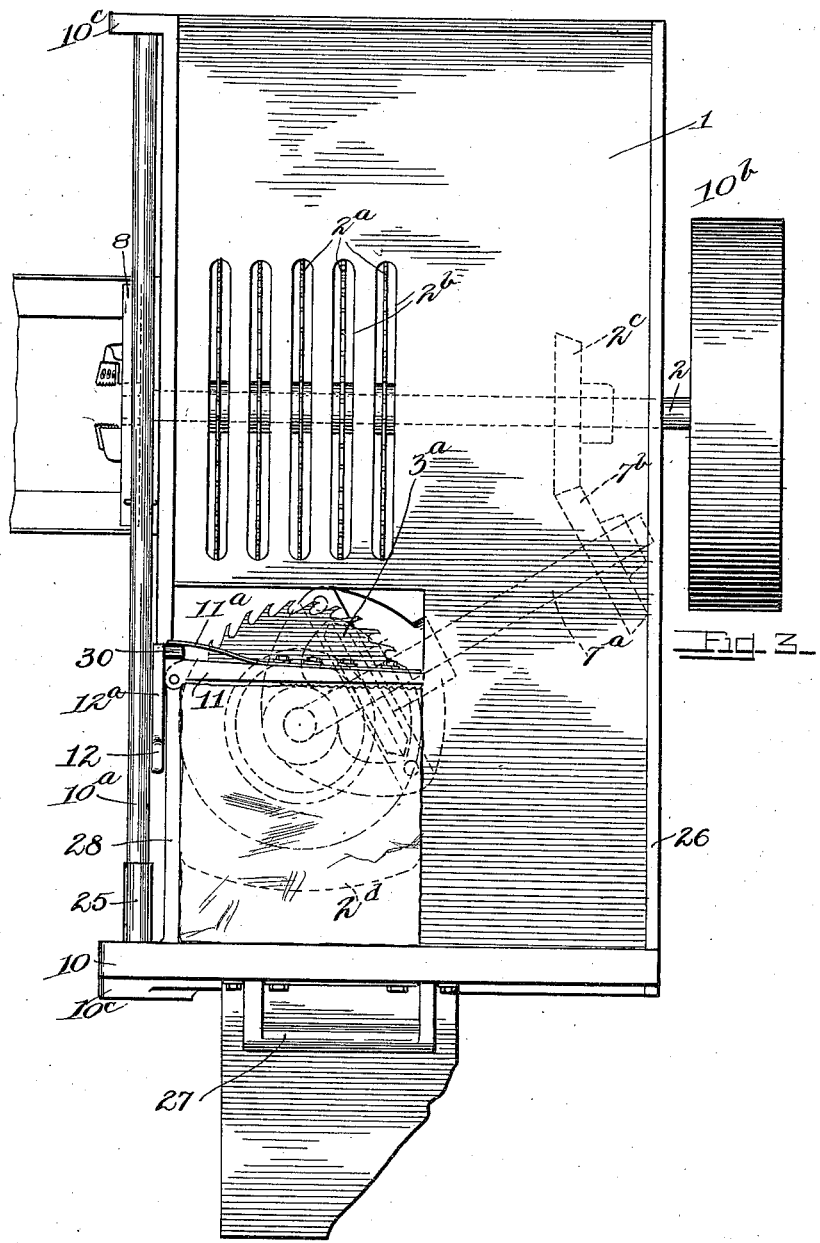

UNITED STATES PATENT OFFICE.

ALLEN W. BODELL, OF WILMETTE, ILLINOIS, ASSIGNOR TO GEORGE S. BLAKESLEE, OF CHICAGO, ILLINOIS.

ICE-CUBING MACHINE.

1,010,013. Specification of Letters Patent. Patented Nov. 28, 1911.

Application filed January 25, 1909. Serial No. 474,178.

*To all whom it may concern:*

Be it known that I, ALLEN W. BODELL, a citizen of the United States, residing at Wilmette, in the county of Cook and State of Illinois, have invented certain new and useful Improvements in Ice-Cubing Machines, of which the following is a specification, reference being had to the accompanying drawings.

My invention relates to machines for cutting up blocks of ice into small cubes suitable for table use, and has for its object to provide certain improvements by which the ice may be more conveniently handled and cut up expeditiously into small cubes.

It comprises, generally speaking, a suitable table or support, through which project several parallel circular saws composing a gang, said saws being set a distance apart equal to one of the dimensions of the cubes or cubical blocks to be formed. Said saws are for the purpose of scoring the ice in two directions at right angles to each other so that by severing the ice in a plane perpendicular to the scorings cubical blocks will be formed. The latter operation is performed by a horizontally-disposed circular saw which is mounted to be moved vertically into and out of operative position. When in inoperative position said saw is flush with the surface of the table and forms a continuation or extension thereof and also a rotary support or turn-table upon which the block of ice to be cut up may be supported while it is turned partly around. When the horizontal saw is to be used for severing the blocks of ice it is raised above the level of the table a distance equal to one of the dimensions of the blocks to be cut. It is then operatively connected with suitable driving mechanism so that it is positively driven and acts to sever the blocks of ice which then drop through the opening in the table in which said saw lies when not in use as a saw.

In the accompanying drawings, which illustrate one embodiment of my invention,—Figure 1 is a side view, partly broken away; Fig. 2 is an end view, some parts being broken away; Fig. 3 is a plan view; and Fig. 4 is a detail illustrating the manner in which the ice-holding arm is secured in position.

Referring to the drawings,—1 indicates a table or supporting platform on which the masses of ice to be operated upon may be placed, said table being preferably supported by legs or standards in any convenient way. Said table is provided, preferably about the center, near one side, with a series of parallel slots $2^b$ through which project the upper portions of a gang of parallel circular saws $2^a$ which are mounted on a shaft 2 extending transversely under the table 1, as shown in Fig. 3. The saws $2^a$ are all keyed to the shaft 2 so that they rotate in unison therewith. The shaft 2 is driven by a belt running over a pulley, or in any other suitable way. $2^d$ indicates an opening in the table 1 adjacent to the edges of the gang of saws $2^a$, as shown in Fig. 3.

$3^a$ indicates a horizontal circular saw which, when not in use as a saw, lies in the opening $2^d$ in a position flush with the surface of the table 1, as shown in Fig. 1. Said saw $3^a$ is mounted upon the upper end of a vertical shaft 3 which extends through a sleeve 20, shown in dotted lines in Fig. 2, and is fitted loosely thereon so that said sleeve may turn independently of said shaft. Said sleeve 20 is mounted in a suitable bearing 21 which forms a part of the framework of the apparatus, and carries at its upper end a bevel gear 6 which meshes with a bevel gear 7 mounted upon a shaft $7^a$ arranged under the table 1, the latter shaft carrying also a bevel gear $7^b$ which meshes with a bevel gear $2^c$ mounted on the shaft 2, as best shown in dotted lines in Fig. 3. By this construction rotation of the shaft 2 will operate to drive the bevel gear 6 together with the sleeve 20 which carries it.

22 indicates a collar mounted on the lower end of the sleeve 20 and keyed thereto by a set-screw 23 so as to rotate therewith. Said collar has on its lower margin a projecting lug $3^c$, best shown in Fig. 2, which is adapted to engage a lug $3^b$ carried by the shaft 3 near its lower end. When the circular saw $3^a$ is in its lowermost position the lug $3^b$ does not engage the lug $3^c$ and consequently the gear 6 and sleeve 20 which carries it may rotate freely without rotating the shaft 3 and saw $3^a$. When, however, the shaft 3 is moved vertically to lift the saw $3^a$ into operative position, shown in dotted lines in Fig. 2, the lug $3^b$ is brought into position to engage the lug $3^c$ and consequently the shaft 3 is then driven by the gear 6. For the purpose of moving the shaft 3 vertically I provide a lever 4 pivoted at 24 to a suitable standard 5 and having an arm 4ª which underlies the lower end of the shaft 3 so that by depressing the outer end of the lever 4 the shaft 3 may be raised. An operating rod 4ᵇ is provided for operating the lever 4.

15 indicates a catch or detent which is pivotally connected at its upper end with the frame of the table and hangs suspended over the outer end of the lever 4 in such position that when said lever is actuated to raise the shaft 3 the detent 15 swings in over it and holds it in such position. The lever 4 may be released to permit the shaft 3 to descend by simply moving the detent out of engagement therewith.

It will be observed that with the construction above described when the horizontal saw 3ª is in its inoperative position it is not driven and may freely be rotated by hand, and as it is flush with the upper surface of the table 1 it constitutes a turn-table upon which the mass of ice may readily be turned as may be necessary in properly presenting it to the gang of saws 2ª so as to form scorings along lines perpendicular to each other.

In practice the mass of ice to be cut is placed on the table and slid along until it rests upon the horizontal saw, when it is moved over the gang of saws 2ª which cut parallel grooves in the lower surface thereof. It is then slid back upon the horizontal saw and turned through an arc of ninety degrees and then again passed over the saws 2ª, thereby making another series of scores at right angles to those first formed. The lever 4 is then operated to raise the horizontal saw into operative position, whereupon it is driven from the shaft 2 by means of the connections hereinbefore described, and the ice is then moved against said horizontal saw which severs the previously scored portion of the ice into cubical blocks, which fall through the opening 2ᵈ into any suitable receptacle placed to receive them.

For conveniently controlling the movement of the block of ice, I provide guiding mechanism consisting of a guide-rod 10ª supported at its ends in lugs 10ᶜ, said rod extending along one side of the table 1, as shown in Fig. 3.

10 indicates a bar or head which extends transversely of the table 1 and is connected by a sleeve 25 with the guide 10ª, its opposite end being provided with a lip 10ᵇ which rests upon a rail 26 at the opposite side of the table, as shown in Figs. 2 and 3.

27 indicates a handle for conveniently moving the head 10 back and forth.

28 indicates an arm projecting from the head 10 parallel with the rod 10ª for engaging one side of the block of ice.

11 indicates an arm pivoted to the arm 28 near the free end thereof and adapted to extend at right angles thereto across another face of the mass of ice, said arm 11 being preferably serrated, as shown in Figs. 3 and 4.

12 indicates a lever pivoted at 29 to the arm 28, as shown in Fig. 4, and having a short crank-arm 12ª extending at right angles thereto, as shown in said figure. The arm 12ª carries a pin 30 which is adapted to extend across the front of the inner portion of the arm 11 and act as a stop to hold it in a position substantially at right angles with the bar 28.

11ª indicates a spring carried by the arm 11 and engaging the pin 30 to hold said pin in position. When the lever 12 is in its horizontal position, as shown in dotted lines in Fig. 4, the arm 11 is free to swing upon its pivot, but by turning the lever 12 into a more nearly vertical position, as also shown in Fig. 4, the pin 30 may move into position to hold the arm 11 in the position shown in Fig. 3, thereby clamping the mass of ice between said arm 11 and the head 10.

5ª indicates a stop for limiting the movement of the lever 4.

8 indicates a rotary head having blades for shaving ice, said head being mounted on the shaft 2.

So far as I am aware, I am the first in the art to provide an ice cutting apparatus with a horizontal saw which operates also as a turn-table for supporting the mass of ice, and I also believe myself to be the first in the art to provide an ice cutting apparatus with a horizontal saw movable vertically into and out of operative position and operating in connection with one or more vertical saws which serve to score the mass of ice before it is operated upon by such horizontal saw. These features are therefore claimed broadly, and the claims hereinafter made are to be construed accordingly.

That which I claim as my invention, and desire to secure by Letters Patent is,—

1. An ice-cutting apparatus, comprising a table, a horizontally-disposed saw, means supporting said saw on a level with said table, means for lifting said saw above the level of the table, driving mechanism adapted to operate to drive said saw when it is lifted above the level of the table and to be disconnected therefrom when it is in its inoperative position, and means for scoring the mass of ice.

2. An ice-cutting apparatus, comprising a table, a rotary saw mounted in a horizontal position adjacent to said table and adapted to occupy a position substantially level with the table when in inoperative position, means for raising said saw above the level of the table, driving mechanism, means for connecting said saw with said driving mechanism when it is raised above the level of the table and for disconnecting it therefrom when it is lowered to its inoperative position, and means for scoring the mass of ice.

3. An ice-cutting apparatus, comprising a table, a horizontally-disposed saw, means supporting said saw on a level with said table, means for lifting said saw above the level of the table, driving mechanism adapted to operate to drive said saw when it is lifted above the level of the table and to be disconnected therefrom when it is in its inoperative position, and one or more saws projecting above the level of the table for scoring the mass of ice.

4. An ice-cutting apparatus, comprising a table, a rotary saw mounted in a horizontal position adjacent to said table and adapted to occupy a position substantially level with the table when in inoperative position, means for raising said saw above the level of the table, driving mechanism, means for connecting said saw with said driving mechanism when it is raised above the level of the table and for disconnecting it therefrom when it is lowered to its inoperative position, and one or more saws projecting above the level of the table for scoring the mass of ice.

5. An ice-cutting apparatus, comprising a table, a driving-shaft, a gang of parallel saws driven by said shaft and projecting above the surface of the table for scoring the mass of ice, a horizontal saw adapted to occupy a position level with the surface of the table and movable above the level of the table, and means for driving said horizontal saw from said shaft when raised above the level of the table and for disconnecting it therefrom when lowered to its inoperative position.

6. An ice-cutting apparatus, comprising a table, one or more vertically-disposed saws projecting therethrough for scoring the mass of ice, and a saw mounted on a vertically-disposed shaft and adapted to lie flush with the surface of the table, said saw being movable above the surface of the table, said table being open adjacent to said saw for the discharge of the severed blocks of ice.

7. An ice-cutting apparatus, comprising a table, one or more vertically-disposed saws projecting therethrough for scoring the mass of ice, a saw mounted on a vertically-disposed shaft and adapted to lie flush with the surface of the table, said saw being movable above the surface of the table, driving mechanism, and means operated by the movement of the saw into its operative position for connecting it with the driving mechanism.

8. An ice-cutting apparatus, comprising a table, one or more vertically-disposed saws projecting therethrough for scoring the mass of ice, a saw mounted on a vertically-disposed shaft and adapted to lie flush with the surface of the table, said saw being movable above the surface of the table, said table being open adjacent to said saw for the discharge of the severed blocks of ice, and means for holding and guiding the mass of ice.

9. An ice-cutting apparatus, comprising a table, means for scoring a mass of ice, a horizontally-disposed saw mounted adjacent to the table and adapted to form substantially an extension thereof, said saw being movable so as to lie above the level of the table, and driving mechanism for driving said saw when in the latter position.

10. An ice-cutting apparatus, comprising a table, one or more vertical saws projecting therethrough for scoring a mass of ice, a horizontal saw operating in connection with said vertical saws for severing the ice horizontally, said horizontal saw being movable vertically into and out of operative position, and driving mechanism for driving said saw when in its operative position.

ALLEN W. BODELL.

Witnesses:
G. F. THORNBERGER,
J. N. WIRTH.

Copies of this patent may be obtained for five cents each, by addressing the "Commissioner of Patents, Washington, D. C."